(12) United States Patent
Jones et al.

(10) Patent No.: US 8,095,487 B2
(45) Date of Patent: Jan. 10, 2012

(54) SYSTEM AND METHOD FOR BIASING SEARCH RESULTS BASED ON TOPIC FAMILIARITY

(75) Inventors: Rosie Jones, Pasadena, CA (US); Giridhar Kumaran, Amherst, MA (US); Omid Madani, San Gabriel, CA (US)

(73) Assignee: Yahoo! Inc., Sunnyvale, CA (US)

( * ) Notice: Subject to any disclaimer, the term of this patent is extended or adjusted under 35 U.S.C. 154(b) by 512 days.

(21) Appl. No.: 11/378,871

(22) Filed: Mar. 16, 2006

(65) Prior Publication Data
US 2006/0212423 A1 Sep. 21, 2006

Related U.S. Application Data

(60) Provisional application No. 60/662,307, filed on Mar. 16, 2005.

(51) Int. Cl.
*G06E 1/00* (2006.01)
*G06E 3/00* (2006.01)
(52) U.S. Cl. ............... 706/20; 700/45; 704/9; 707/748
(58) Field of Classification Search ............... 706/20; 705/10, 26, 1, 2, 7; 707/4
See application file for complete search history.

(56) References Cited

U.S. PATENT DOCUMENTS

| | | | |
|---|---|---|---|
| 5,418,948 A * | 5/1995 | Turtle | 707/4 |
| 2003/0115187 A1* | 6/2003 | Bode et al. | 707/3 |
| 2003/0229527 A1* | 12/2003 | Fletcher et al. | 705/7 |

* cited by examiner

*Primary Examiner* — Omar Fernandez Rivas
*Assistant Examiner* — Kalpana Bharadwaj
(74) *Attorney, Agent, or Firm* — Seth H. Ostrow; Ostrow Kaufman LLP

(57) ABSTRACT

A familiarity level classifier comprises a stopwords engine for conducting a stopwords analysis of stopwords, e.g., introductory level stopwords and advanced level stopwords, in a document, e.g., a website; and a familiarity level classifier module for generating a document familiarity level based on the stopwords analysis. The classifier may be in an indexing module, a search engine, a user computer, or elsewhere in a computer network. The classifier may also include a reading level engine for conducting a reading level analysis of the document, and wherein the familiarity level classifier module is configured to generate the familiarity level also based on the reading level analysis. The classifier may also include a document features engine for conducting a feature analysis of the document, and wherein the familiarity level classifier module is configured to generate the document familiarity level also based on the feature analysis.

16 Claims, 8 Drawing Sheets

SYSTEM AND METHOD FOR BIASING SEARCH RESULTS BASED ON TOPIC FAMILIARITY

PRIORITY CLAIM

This application claims benefit of and hereby incorporates by reference provisional patent application Ser. No. 60/662,307, entitled "Biasing Web Search Results for Topic Familiarity," filed on Mar. 16, 2005, by inventors Jones et al.

TECHNICAL FIELD

This invention relates generally to document classifiers, and more particularly provides a system and method for classifying documents based on familiarity levels, e.g., biasing search results based on user familiarity with a topic.

BACKGROUND

The Internet has become a valuable resource of information on a variety of topics. Many websites are directed to teaching users general information about certain topics. Other websites are directed to providing users with cutting-edge information, so that experts can stay abreast of trends, new developments, research possibilities, etc.

When a user wishes to find information on the Internet about a particular topic, the user often directs his or her browser to a search engine and enters a query related to the topic. In response, the search engine applies a relevance function to identify the most relevant websites, and presents the results in an order corresponding to relevance scores. While the website results may relate to the topic, users still have to browse through the websites in an attempt to find those websites with the information on the topic at the particular level of detail desired, especially since different users have varying levels of sophistication. In other words, depending on a user's familiarity with a topic, the user may be more interested in receiving either introductory or advanced documents. A student searching for help with a linear algebra problem requires a different set of documents than a professor of mathematics interested in studying the latest in the field.

Empirically, it has been noted that a typical web search engine, e.g., the Yahoo! search engine, returns a mix of introductory and advanced documents in response to a query. Further, in response to the same query, the search engine will return the same website results to a novice and to an expert, failing to address the backgrounds and requirements of the two users. Currently, there has been no means for a user to inform the search engine of the amount of background knowledge the user has on a topic, so that the search engine can return only those documents appropriate to the user's level of expertise or so that the search engine can group documents according to introductory/advanced levels. Adding trigger words (e.g., "primer," "introduction," "information," "definition," "characteristic," "summary," etc.) to a query to suggest a user has only an introductory level of familiarity with a topic has been found statistically insignificant. Adding trigger words to a query to suggest a user has an advanced level of familiarity with a topic is more difficult.

A system and method are needed that enable automatic classification of documents based on user familiarity with a topic.

SUMMARY

In one embodiment, the present invention provides a familiarity level classifier that applies a familiarity level classification function which is topic-independent, query-independent and user-independent. The familiarity level classifier may determine the familiarity level of a document by analyzing three attributes, namely, (1) the distribution of stopwords in the text, (2) document reading level, and (3) document features such as average line-length. By classifying documents of a document pool, the familiarity level classifier enables ranking the document in the document pool based on familiarity level. Based on the familiarity levels, the documents can be organized so that introductory or advanced documents can be placed higher on the ranked list, so that the documents can be grouped based on their level of familiarity, so that select documents can be forwarded to an end-user based on familiarity level, etc.

In another embodiment, the present invention provides a method, comprising receiving a document; conducting a stopwords analysis of stopwords in the document; and generating a document familiarity level based on the stopwords analysis. The document may include a website. The document may be received at index time or in response to a query. The stopwords analysis may include conducting a stopwords analysis of introductory level stopwords and advanced level stopwords. The method may also include generating a stopwords score based on the stopwords analysis, the stopwords score including a binary value, a sliding scale value, or a descriptor from a set of descriptors. The method may also include conducting a reading level analysis and/or a feature analysis of the document, wherein the document familiarity level is generated based on the reading level analysis and/or feature analysis. The document familiarity level may be generated using a familiarity level classification function that incorporates weighting coefficients for each of the stopwords analysis, the reading level analysis and the feature analysis.

In another embodiment, the present invention provides a familiarity level classifier, comprising a stopwords engine for conducting a stopwords analysis of stopwords in a document; and a familiarity level classifier module for generating a document familiarity level based on the stopwords analysis. The document may include a website. The classifier may be in an indexing module, in a search engine, in a user computer, or elsewhere in the network. The stopwords engine may be configured to conduct a stopwords analysis of introductory level stopwords and advanced level stopwords. The stopwords engine may be configured to generate a stopwords score based on the stopwords analysis, wherein the stopwords score includes a binary value, a sliding scale value, or a descriptor from a set of descriptors. The classifier may also include a reading level engine for conducting a reading level analysis of the document and/or a document features engine for conducting a feature analysis of the document, and wherein the familiarity level classifier module is configured to generate the familiarity level also based on the reading level analysis and/or feature analysis. The familiarity level classifier module may be configured to implement a familiarity level classification function that incorporates weighting coefficients for each of the stopwords analysis, the reading level analysis and the feature analysis.

In yet another embodiment, the present invention provides a system, comprising means for receiving a document; means for conducting a stopwords analysis of stopwords in the document; and means for generating a document familiarity level based on the stopwords analysis.

DETAILED DESCRIPTION

The following description is provided to enable any person skilled in the art to make and use the invention, and is provided in the context of a particular application and its requirements. Various modifications to the embodiments are possible to those skilled in the art, and the generic principles defined herein may be applied to these and other embodiments and applications without departing from the spirit and scope of the invention. Thus, the present invention is not intended to be limited to the embodiments shown, but is to be accorded the widest scope consistent with the principles, features and teachings disclosed herein.

Figure 1:
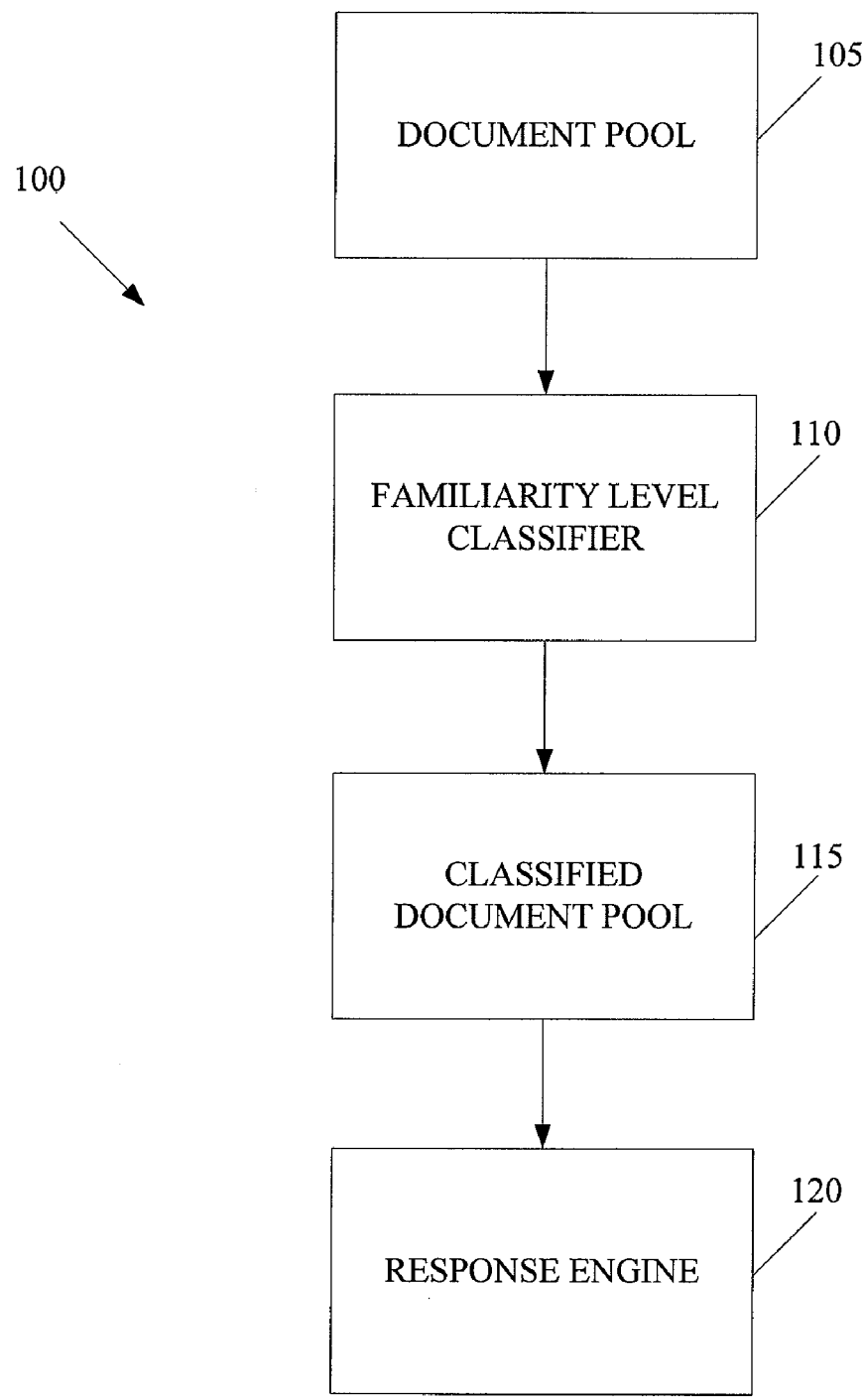
FIG. 1 is a block diagram illustrating a familiarity level classification system, in accordance with an embodiment of the present invention.

FIG. 1 is a block diagram illustrating a familiarity level classification system 100, in accordance with an embodiment of the present invention. The classification system 100 includes a familiarity level classifier 110 that reviews documents from a document pool 105, determines a level of familiarity for a user to understand the document, and appends familiarity level information to the documents to generate a classified document pool 115, the documents being classified based on document familiarity level. The document pool 105 may include a web search result set or a subset of the web search result set. The level of familiarity may be a binary value (e.g., introductory or advanced), a sliding scale value (e.g., a number between 1 and 10 such that a document labeled as 1 is most introductory and a document labeled 10 is most advanced), a descriptor selected from a set of descriptors (e.g., introductory, medium, advanced, expert), etc.

The familiarity level classifier 110 applies a familiarity level classification function that is topic-independent, query-independent and user-independent. In one embodiment, the familiarity level classifier 110 determines the familiarity level of a document by analyzing three attributes of a document, namely, (1) the distribution of stopwords in the text, (2) document reading level, and (3) document features such as average line-length. By classifying the documents of the document pool 105, the familiarity level classifier 110 enables ranking the document pool 105 based on familiarity level.

The familiarity level classification system 100 further includes a response engine 120, e.g., a search engine, web browser, or other module. The response engine 120 operates on the classified document pool 115, e.g., to organize the documents so that introductory documents are placed higher on the ranked list, to group the documents based on their level of familiarity, to forward documents to an end-user based on familiarity level, etc. Although the response engine 120 could retrieve documents from only the set corresponding to the user's preference, this runs the risk of returning less relevant documents in favor of documents at an appropriate familiarity level.

Figure 2:
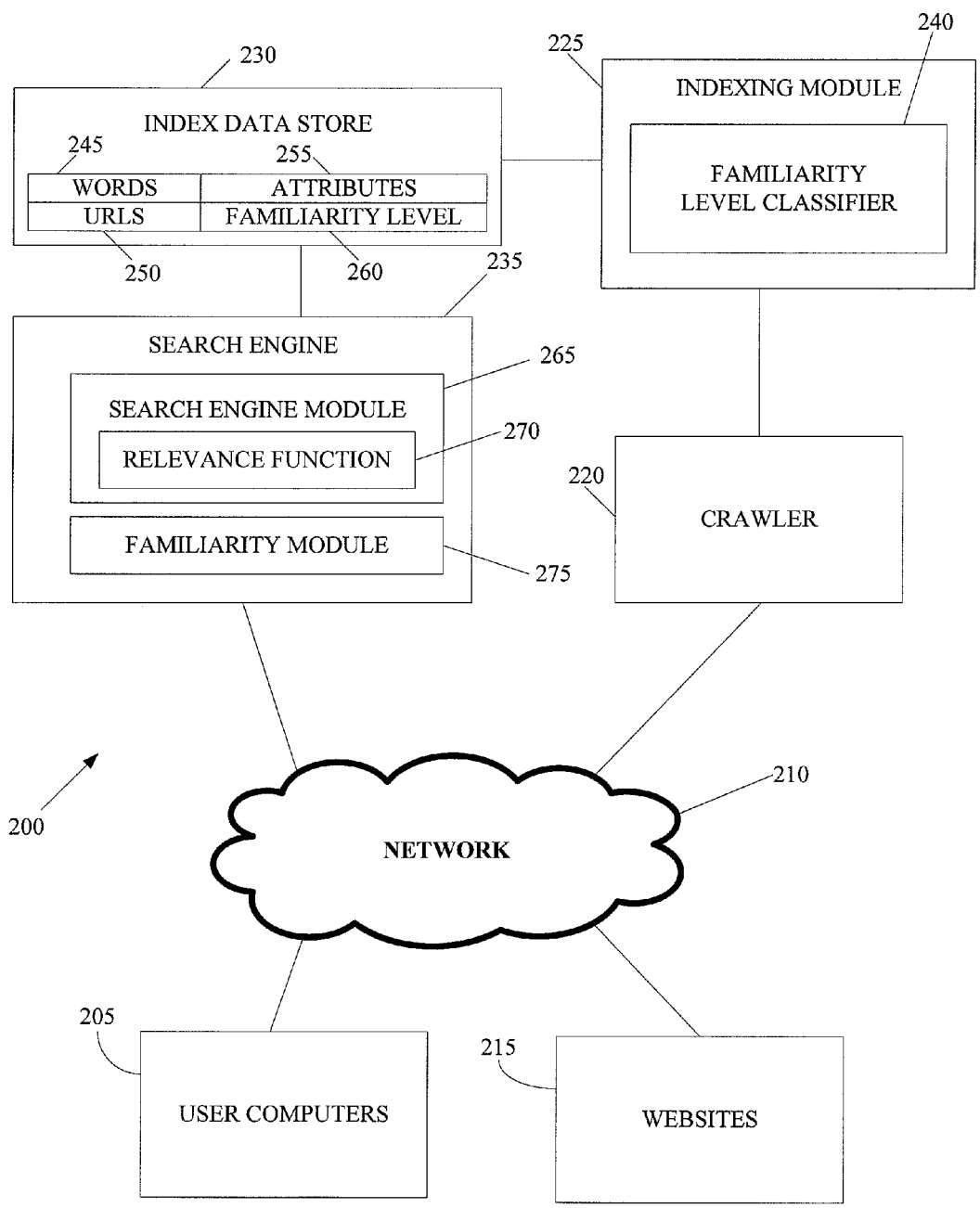
FIG. 2 is a block diagram illustrating a familiarity level classification system in a first search engine environment, in accordance with an embodiment of the present invention.

FIG. 2 illustrates a familiarity level classification system 200 in a search engine environment, in accordance with a first embodiment of the present invention. The familiarity level classification system 200 includes user computers 205 coupled via a computer network 210 to websites 215. A crawler 220 (sometimes referred to as a robot or spider) is coupled to the network 210. An indexing module 225 is coupled to the crawler 220 and to an index data store 230. A search engine 235 is coupled to the index data store 230 and to the network 210.

The crawler 220 is configured to autonomously and automatically browse the billions of pages of websites 215 on the network 210, e.g., following hyperlinks, conducting searches of various search engines, following URL paths, etc. The crawler 220 obtains the documents (e.g., pages, images, text files, etc.) from the websites 215, and forwards the documents to the indexing module 225. An example crawler 120 is described more completely in U.S. Pat. No. 5,974,455 issued to Louis M. Monier on Oct. 26, 1999, entitled "System and Method for Locating Pages on the World-Wide-Web."

Generally, the indexing module 225 parses the documents of the websites 115 received from the crawler 120 for fundamental indexable elements, e.g., atomic pairs of words and locations, dates of publication, domain information, etc. The indexing module 225 sorts the information from the many websites 115, according to their attributes, e.g., website X has 200 instances of the word "dog," and sends the words, locations, and feature information to the index data store 230. The indexing module 225 may organize the feature information to optimize search query evaluation, e.g., may sort the information according to words, according to locations, etc. An example indexing module 225 is described in U.S. Pat. No. 6,021,409 issued to Burrows, et al., on Feb. 1, 2000, entitled "Method For Parsing, Indexing And Searching World-Wide-Web Pages" ("the Burrows patent").

The index data store 230 stores the words 245, locations (e.g., URLs 250) and attributes 255 in various formats, e.g., compressed, organized, sorted, grouped, etc. The information is preferably indexed for quick query access. An example index data store 230 is described in detail in the Burrows patent.

In operation, the search engine 235 receives queries from user computers 205, and uses the index data store 230 and a search engine module 265 that applies a relevance function 270 to determine the most relevant documents in response to the queries. In response to the query, the search engine module 265 returns a list of the most relevant websites 215 to the user computer 205. The search engine 135 may store the query, the response, and possibly user actions (clicks, time on each site, etc.) in a query log (not shown), for future analysis, use and/or relevance function development/modification.

As shown in this embodiment, the indexing module 225 further includes a familiarity level classifier 240 similar to the familiarity level classifier 110 of FIG. 1. The familiarity level classifier 240 receives documents from the crawler 220, reviews the reading level, stopwords and document features of each document to determine its familiarity level, and provides the familiarity level 260 to the index data store 230 for future use. The index data store 230 stores the familiarity level 260 with the words 245, locations 250 and attributes 255.

The search engine 235 further includes a familiarity module 235. The familiarity module 235 reviews the familiarity levels 260 of a subset of the result set of relevant documents, e.g., the top 10, 20 or 100 documents, and groups, sorts, culls, etc. the result subset in accordance with the user's familiarity. When used for re-ranking a subset of the search results, the familiarity module 275 may only increase precision at the top of the list. Information identifying the familiarity of the user may be provided in the query. In another embodiment, the familiarity module 275 may be on the user computer 205, so that the result set/subset can be grouped, sorted, culled, etc. without the search engine 235. In such case, the familiarity module 275 on the user computer 205 would need access to the familiarity levels 260 of the documents in the result set or subset to enabling re-organization. The familiarity levels 260 may be appended to the documents in the result set or subset. The user computer 205 can rank results from low-to-high or high-to-low on the topic familiarity scale, possibly through a button or slider on the search page.

Figure 3:
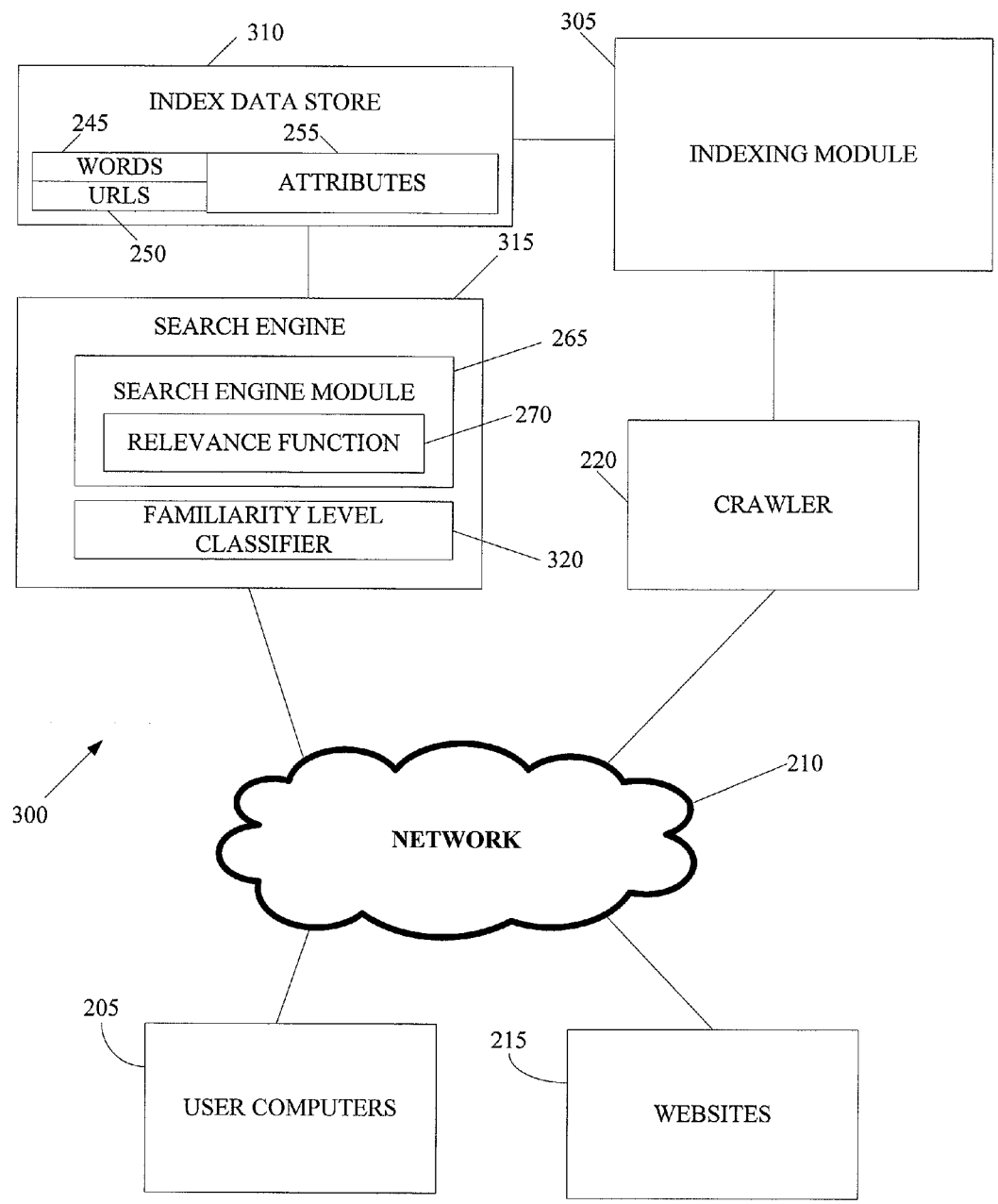
FIG. 3 is a block diagram illustrating a familiarity level classification system in a second search engine environment, in accordance with an embodiment of the present invention.

FIG. 3 illustrates a familiarity level classification system 300 in a search engine environment, in accordance with a second embodiment of the present invention. Familiarity level classification system 300 is similar to the familiarity level classification system 200 in FIG. 2. Element numbers are maintained the same in FIGS. 2 and 3 for convenience, although the elements need not be identical.

The familiarity level classification system 300 includes user computers 205 coupled via a computer network 210 to websites 215. A crawler 220 is coupled to the network 210. An indexing module 305 is coupled to the crawler 220 and to an index data store 310. A search engine 315 is coupled to the index data store 310 and to the network 210.

In this embodiment, the indexing module 305 is similar to the indexing module 225 of FIG. 2, except one difference is the absence of the familiarity level classifier 240. The index data store 310 is similar to the index data store 230, except one difference is that the index data store 310 does not store familiarity levels associated with the documents. The search engine 315 is similar to the search engine 235, except one difference is the replacement of the familiarity module 275 with a familiarity level classifier 320. In other embodiments, the familiarity level classifier 320 may be located on any computer in the network system 300, e.g., on the user computer 205.

In operation, the familiarity level classifier 320 can determine familiarity levels during runtime, and can organize, cull, group, etc. the result set or a subset of the result set before transferring the information to the user computer 205.

Figure 4:
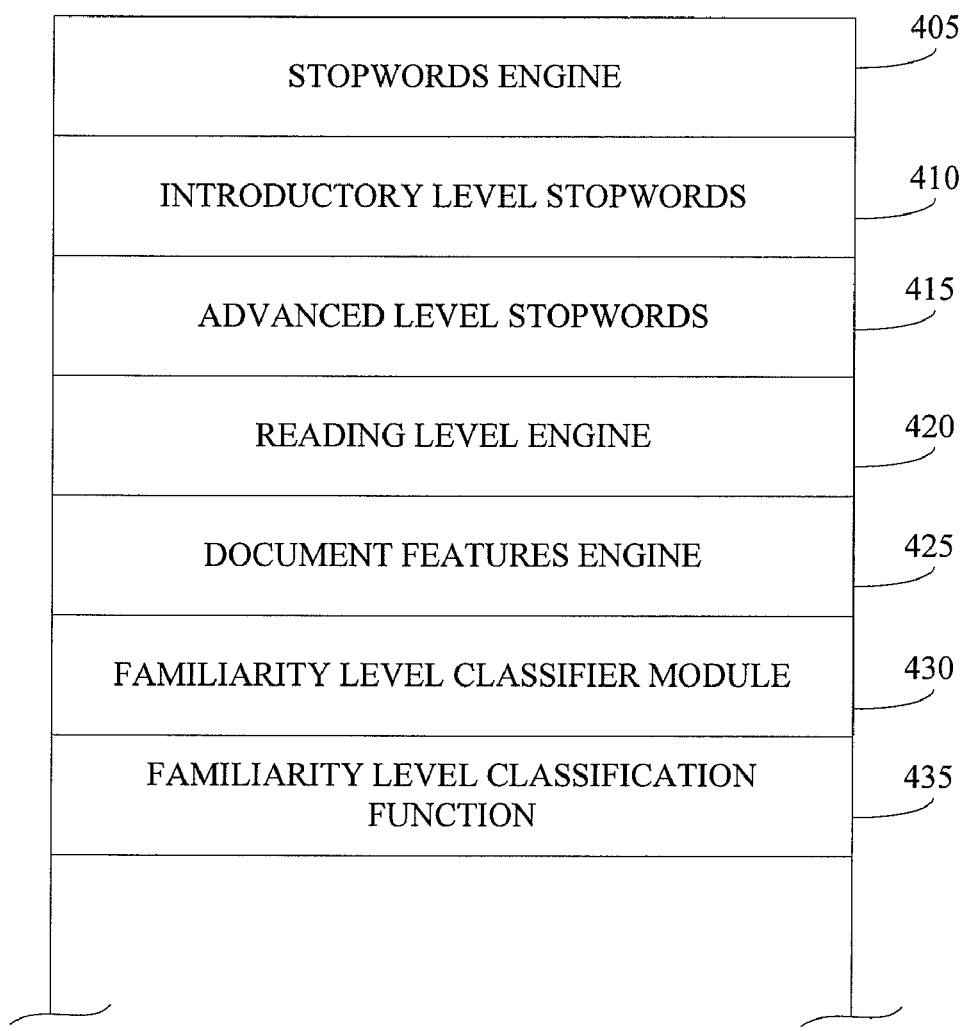
FIG. 4 is a block diagram illustrating details of a familiarity level classifier of FIG. 1 or FIG. 2, in accordance with an embodiment of the present invention.

FIG. 4 is a block diagram illustrating details of an embodiment of the familiarity level classifier 400, which is an instance of classifiers 110/240/320. One skilled in the art will recognize that each classifier 110/240/320 may have minor variations, e.g., for communication purposes (e.g., requesting familiarity level information, forwarding re-ranked documents, etc). The familiarity level classifier 400 includes a stopwords engine 405, introductory-level stopwords 410, advanced-level stopwords 415, a reading level engine 420, a document features engine 425, a familiarity level classifier module 430 and a familiarity level function 435.

To avoid confounding the familiarity level classifier 400, the familiarity level classifier 400 implements a familiarity level classification function 435 that is user-independent, query-independent and topic-independent. For example, without query independence, a document describing molecular biology might be labeled as "advanced" for the query of "biology" or as "introductory" for the query of "molecular biology," on the assumption that web searchers issuing these two queries would have different levels of topic familiarity. Accordingly, the familiarity level classifier 400 defines an introductory web page as "a web page that does not presuppose background knowledge of the topic it is on, and to an extent introduces or defines key terms on the topic," and an advanced web page as "a web page that assumes sufficient background knowledge of the topic it is on and familiarity with the key technical/important terms on the topic, and potentially builds on them."

Stopwords generally are words which are so common that they are generally quite useless to index or use in search engines or other search indexes. Stopwords may include articles, adverbials or adpositions. In English, stopwords may include "a", "of", "the", "it", "you", "and," etc. The stopwords engine 405 reviews a document to determine the presence of introductory level stopwords 410 (e.g., so, enough, just, in, needs, help, each, away) and the presence of advanced level stopwords 415 (e.g., if, cause, while, way, through, which, us). In this embodiment, the presence of an introductory level stopword 410 in a document suggests introductory content. The presence of advanced level stopword 415 in a document suggests advanced content. In other words, the presence of certain stopwords may suggest a particular genre or writing style, such that the presence of introductory level stopwords 410 suggests informal or colloquial writing and the presence of advanced-level stopwords 415 suggests more formal or scientific writing. The stopwords engine 405 may also review documents to obtain stopword frequencies, and may possibly use the Rainbow Library to assist with determining stopword frequencies. The stopwords engine 405 generates a stopwords score that predicts a familiarity level, and forwards the stopwords score to the familiarity level classifier module 430. In some embodiments, the sign of the stopwords score indicates the class (i.e., introductory or advanced). The stopwords score may be a binary value, a sliding scale value, a descriptor, etc.

The reading level engine 420 interprets reading level of a document to estimate familiarity level. Example features used to determine reading level include the Fog measure, the Flesch measure, the Kincaid measure, number of characters, number of words, percentage of complex words, number of sentences, number of text lines, number of blank lines, number of paragraphs, number of syllables per word, the number words per sentence, etc. To obtain reading level scores, the reading level engine 420 may implement publicly available techniques. For example, the reading level engine 420 may generate reading level scores using Fog, Flesch and/or Kincaid equations, which are shown in Equations 1, 2 and 3.

$$\text{Fog} = (\text{words-per-sentence} + \% \text{ complex-words}) * 0.4 \quad (1)$$

$$\text{Flesch} = 206.835 - (1.015 * \text{words-per-sentence}) - (84.6 * \text{syllables-per-word}) \quad (2)$$

$$\text{Kincaid} = (11.8 * \text{syllables-per-word}) + (0.39 * \text{words-per-sentence}) - 15.59 \quad (3)$$

The Fog index is designed to indicate a number of years of formal education required to read a document once and understand it. In one test, the introductory and advanced documents scored an average of 20 (unreadable) on the Fog index. This may be due in part to outlier documents (the standard deviations were extremely high), and may be due in part to a mismatch between these indices, the form of web documents, and the automated way reading level features such as syllables per word are calculated. Introductory documents did average slightly lower than advanced documents. However, the difference was less than the standard deviation.

The Flesch index rates documents on a 100 point scale, with higher scores indicating greater readability and 60-70 considered optimal. In one test using the Flesch scale, example documents averaged around 20, with introductory documents slightly higher (slightly more readable) than advanced documents. However, like the Fog measure, the difference was less than the standard deviation.

The Kincaid measure scores reading level in terms of U.S. grade-school level. In several tests, the Kincaid measure scored introductory documents with slightly better readability than advanced documents. However, again, the difference was less than the standard deviation.

The reading level engine 420 generates a reading level score commensurate with the readability of the document, and forwards the reading level score to the familiarity level classifier module 430. Although the Fog, Flesch and Kincaid measures in some tests measured small differences between introductory and advanced documents, the familiarity level classification module 430 may amplify the variation to create greater distinction. The reading level score may be a binary value, a sliding scale value, a descriptor, etc.

The document features engine 425 examines document features to generate a features score indicative of familiarity level. Example discriminatory document features are listed in the table below.

| | Document features | Hypothesis |
|---|---|---|
| 1. | Avg. num. of words per line with anchor text removed. | Web pages with a lot of non-anchor text are introductory |
| 2. | Avg. num. of anchor text words per line with other text removed. | An advanced web page has more anchor text per line |
| 3. | Document length excluding anchor text. | Longer documents are introductory |
| 4. | Anchor text count. | An advanced web page has more anchor text |
| 5. | Fraction of non-anchor text in document. | Lower the fraction, more introductory the document |
| 6. | Average word length (excluding anchor text). | Advanced documents have higher average word length due to more complex vocabulary. |
| 7. | Fraction of term "the" in text excluding anchor text. | Low fraction implies an introductory document. |
| 8. | Fraction of term "a" in text excluding anchor text. | High fraction implies an introductory document. |
| 9. | Fraction of term "an" in text excluding anchor text. | High fraction implies an introductory document. |
| 10. | Average of the top five highest TFs. | Salient terms are repeated in introductory documents. |
| 11. | Similarity of WordNet expansion of top 10% of document with remaining 90% | The last 90% of an introductory document describes the first 10% |

The document features engine 425 generates a features score indicative of the familiarity level of the document, and forward the features score to the familiarity level classifier module 430. The features score may be a binary value, a sliding scale value, a descriptor, etc.

The familiarity level classifier module 430 implements a familiarity level classification function 435 that uses the stopwords score, the reading level score and the document features score from the stopwords engine 405, the reading level engine 420 and the document features engine 425, respectively, to predict whether a document is introductory or advanced or to generate a familiarity level score indicative of how introductory or how advanced the document is. In one embodiment, the familiarity level classification function 435 includes weighting coefficients for each of the scores from each of the attribute engines 405, 420 and 425. In one embodiment, the stopwords score measured by the stopwords engine 405 carries the greatest weight. Other embodiments may predict familiarity level based only on the stopwords score from stopwords engine 405, a blend of the scores from the stopwords engine 405 and from the reading level engine 420, a blend of the scores from the stopwords engine 425 and the document features engine 425, etc. In some embodiments, the sign of the familiarity level indicates the class (i.e., introductory or advanced) and the magnitude of the familiarity level indicates how introductory or how advanced the document is in its class.

To generate the coefficients for the familiarity level classification function 435, a training algorithm (not shown) that can handle nonlinearity and a mix of different feature types with different value ranges can be used. In experiments, random forests proved to be the most convenient choice in addressing nonlinearity and handling the mix of different (numeric) feature types. Although experiments showed that random forests was most effective, linear SVMs and committees of perceptrons came close. Briefly, a random forest is the sum of the scores of k decision trees, where each decision tree is trained on a bootstrap sample of the training fold. At each tree level, a random feature is chosen and the best single partitioning value for that feature (minimizing the entropy) is chosen to partition the data at that node. Partitioning is done until all instances at a node have the same label. No pruning is performed.

Features other than stopwords that were often ranked high by the training algorithm included several reading level features (e.g., syllables-per-word, percent-complex-words), which had positive coefficients indicative of introductory documents, and one non-textual feature (average-word-length), which had a negative coefficient indicative of advanced documents.

An example familiarity level classification function 435 for determining the familiarity level of a document may be based on weighting coefficients of various stopwords, reading levels (see, e.g., Flesch, Kincaid, Fog) and document features. In one example, familiarity level may be determined by determining the feature values for each of the features provided in the list below. For stopwords, the feature values may be the number of instances of the word in each document. For reading levels, the feature values may be the value generated by the reading level function (e.g., Flesch, Kincaid, Fog). For document features, the feature values may be the values computed by the particular feature, e.g., a count value. Each of the feature values may be normalized by dividing the value by the maximum value of any document in the document pool. For example, if the number of instances of the word "so" in a document is 5, and the highest number of instances of the word "so" in any document in the document pool is 20, then the feature value for the document with 5 instances may be normalized to 5/20 or 0.25. Then, after all feature values (normalized per feature) are determined, the feature values are normalized to sum to one (1). For example, if the sum total of all feature values (normalized per feature) for a document is equal to 500, then the feature value for the word "so" will be normalized to $^{0.25}/_{500}$ or 0.0005. After the second normalization, the feature values are each multiplied by their corresponding weighting coefficient and summed to generate the familiarity level of the document. In this embodiment, please note that the familiarity level classification function incorporates the summing of a stopwords score, a reading level score and a document features score.

Example weighting coefficients, in order of decreasing magnitude, are provided below. Please note that the "null" features below have no impact on the function result.

| order. name | id | weight | std |
|---|---|---|---|
| 1. "so" | (178) | 1.24343 | 0.431106 |
| 2. "com" | (128) | −1.05705 | 0.289472 |
| 3. "comes" | (435) | −0.937931 | 0.384345 |
| 4. "follows" | (428) | −0.86139 | 0.400758 |
| 5. "by" | (122) | 0.722223 | 0.342136 |
| 6. "saw" | (414) | 0.709742 | 0.237394 |
| 7. "needs" | (162) | 0.707299 | 0.408867 |
| 8. "happens" | (317) | 0.701351 | 0.489256 |
| 9. "seven" | (255) | 0.664212 | 0.301502 |
| 10. "anybody" | (572) | −0.653046 | 0.172501 |
| 11. "specified" | (352) | −0.614471 | 0.410961 |
| 12. "sorry" | (351) | 0.606622 | 0.532332 |
| 13. "inner" | (480) | −0.588414 | 0.335875 |
| 14. "hardly" | (519) | −0.58534 | 0.344683 |
| 15. "meanwhile" | (566) | −0.58507 | 0.229559 |
| 16. "tell" | (356) | −0.564996 | 0.216349 |
| 17. "no" | (241) | −0.561807 | 0.339088 |
| 18. "both" | (224) | 0.561701 | 0.380051 |
| 19. "therein" | (472) | 0.560571 | 0.343155 |
| 20. "somewhere" | (482) | −0.536037 | 0.370152 |
| 21. "tries" | (407) | −0.535146 | 0.260744 |
| 22. "never" | (332) | −0.529589 | 0.311039 |
| 23. "themselves" | (388) | −0.528066 | 0.358335 |
| 24. "after" | (102) | −0.523398 | 0.296162 |
| 25. "become" | (221) | 0.523245 | 0.311741 |
| 26. "awfully" | (548) | −0.518193 | 0.28899 |
| 27. "sure" | (355) | 0.510046 | 0.36398 |
| 28. "nearly" | (439) | 0.505725 | 0.430119 |
| 29. "described" | (508) | −0.500482 | 0.324546 |
| 30. "outside" | (338) | 0.499711 | 0.374115 |
| 31. "ask" | (292) | −0.496784 | 0.35343 |
| 32. "all" | (103) | −0.492021 | 0.307784 |
| 33. "Number of anchor text words" | (24) | −0.487982 | 0.44553 |
| 34. "appreciate" | (384) | 0.483741 | 0.544943 |
| 35. "although" | (218) | 0.482131 | 0.197582 |
| 36. "am" | (106) | −0.471326 | 0.346097 |
| 37. "beforehand" | (558) | 0.467536 | 0.391393 |
| 38. "second" | (251) | 0.459795 | 0.475948 |
| 39. "whole" | (410) | −0.45777 | 0.411724 |
| 40. "some" | (179) | 0.454114 | 0.25612 |
| 41. "really" | (425) | −0.453692 | 0.411103 |
| 42. "he" | (319) | 0.449621 | 0.426538 |
| 43. "latter" | (446) | 0.44947 | 0.354468 |
| 44. "our" | (174) | 0.436091 | 0.504575 |
| 45. "mainly" | (236) | 0.435064 | 0.458571 |
| 46. "mean" | (454) | −0.424392 | 0.231936 |
| 47. "allows" | (466) | −0.423072 | 0.345928 |
| 48. "against" | (217) | −0.419724 | 0.342119 |
| 49. "next" | (164) | −0.416808 | 0.501927 |
| 50. "seemed" | (505) | −0.412869 | 0.118696 |
| 51. "and" | (109) | 0.409452 | 0.546573 |
| 52. "regards" | (522) | −0.405913 | 0.359614 |
| 53. "normally" | (532) | −0.405045 | 0.521084 |
| 54. "other" | (173) | 0.392038 | 0.573997 |
| 55. "are" | (112) | 0.391378 | 0.434759 |
| 56. "whose" | (267) | 0.391357 | 0.369373 |
| 57. "my" | (160) | −0.390088 | 0.489109 |
| 58. "took" | (473) | −0.388525 | 0.201245 |
| 59. "him" | (321) | 0.388102 | 0.545436 |
| 60. "exactly" | (419) | −0.382414 | 0.167543 |
| 61. "three" | (362) | −0.380798 | 0.458944 |
| 62. "away" | (293) | 0.379971 | 0.410157 |
| 63. "became" | (400) | 0.379678 | 0.299571 |
| 64. "definitely" | (552) | 0.378304 | 0.431662 |
| 65. "been" | (295) | −0.376818 | 0.250037 |
| 66. "indicates" | (493) | −0.370361 | 0.331995 |
| 67. "elsewhere" | (423) | −0.368189 | 0.438238 |
| 68. "changes" | (127) | 0.347643 | 0.531522 |
| 69. "indicated" | (492) | −0.346402 | 0.188101 |
| 70. "often" | (168) | 0.345518 | 0.538341 |
| 71. "becoming" | (377) | 0.34191 | 0.238597 |
| 72. "done" | (445) | 0.341699 | 0.232952 |
| 73. "inc" | (150) | −0.338969 | 0.189191 |
| 74. "off" | (279) | 0.337766 | 0.281252 |
| 75. "her" | (320) | 0.337515 | 0.37747 |
| 76. "known" | (154) | −0.334781 | 0.279718 |
| 77. "ok" | (484) | −0.333719 | 0.236024 |
| 78. "amongst" | (530) | −0.331957 | 0.402409 |
| 79. "herein" | (512) | 0.331478 | 0.39888 |
| 80. "his" | (322) | 0.327521 | 0.394415 |
| 81. "greetings" | (550) | −0.327496 | 0.528934 |
| 82. "having" | (318) | 0.326909 | 0.458229 |
| 83. "every" | (135) | −0.323404 | 0.542644 |
| 84. "thank" | (394) | 0.322361 | 0.511765 |
| 85. "be" | (116) | −0.320163 | 0.46727 |
| 86. "is" | (151) | 0.316869 | 0.285395 |
| 87. "specifying" | (578) | −0.316173 | 0.49072 |
| 88. "its" | (232) | −0.315598 | 0.314516 |
| 89. "even" | (307) | 0.315597 | 0.376144 |
| 90. "please" | (175) | 0.315093 | 0.39228 |
| 91. "cant" | (560) | 0.310144 | 0.3513 |
| 92. "anyway" | (434) | −0.305827 | 0.103736 |
| 93. "when" | (373) | 0.304248 | 0.192646 |
| 94. "furthermore" | (518) | −0.303678 | 0.510704 |
| 95. "everywhere" | (389) | 0.302527 | 0.249673 |
| 96. "need" | (161) | 0.300746 | 0.44153 |
| 97. "many" | (329) | 0.298778 | 0.335644 |
| 98. "of" | (167) | −0.297952 | 0.523917 |
| 99. "somehow" | (504) | 0.295584 | 0.391044 |
| 100. "say" | (415) | −0.295023 | 0.527816 |
| 101. "thoroughly" | (448) | −0.294641 | 0.422302 |
| 102. "indeed" | (513) | −0.290978 | 0.243169 |
| 103. "following" | (273) | 0.290613 | 0.441764 |
| 104. "on" | (169) | 0.290406 | 0.386638 |
| 105. "re" | (343) | −0.290143 | 0.37064 |
| 106. "said" | (345) | −0.289747 | 0.409366 |
| 107. "course" | (401) | 0.287374 | 0.498002 |
| 108. "others" | (336) | −0.286242 | 0.35875 |
| 109. "maybe" | (457) | −0.285102 | 0.369365 |
| 110. "five" | (227) | −0.284807 | 0.50727 |
| 111. "forth" | (553) | 0.282735 | 0.180007 |
| 112. "twice" | (459) | −0.282329 | 0.31022 |
| 113. "always" | (105) | −0.276553 | 0.545321 |
| 114. "either" | (436) | −0.275882 | 0.419157 |
| 115. "not" | (165) | 0.275102 | 0.515357 |
| 116. "moreover" | (494) | −0.274062 | 0.220721 |
| 117. "theres" | (576) | −0.274039 | 0.407446 |
| 118. "throughout" | (450) | 0.270674 | 0.401317 |
| 119. "until" | (366) | 0.270131 | 0.278463 |
| 120. "six" | (432) | −0.266928 | 0.359235 |
| 121. "via" | (409) | −0.265865 | 0.506434 |
| 122. "yes" | (376) | −0.265311 | 0.418642 |
| 123. "usually" | (368) | −0.264496 | 0.467665 |
| 124. "tends" | (483) | 0.264144 | 0.447287 |
| 125. "certain" | (299) | −0.263371 | 0.276628 |

| order. | name | id | weight | std |
|---|---|---|---|---|
| 126. | "specify" | (540) | −0.261697 | 0.465085 |
| 127. | "value" | (369) | −0.259846 | 0.499858 |
| 128. | "someone" | (349) | −0.259643 | 0.544859 |
| 129. | "example" | (310) | −0.259267 | 0.312794 |
| 130. | "down" | (304) | −0.257943 | 0.340713 |
| 131. | "under" | (284) | 0.256497 | 0.294323 |
| 132. | "rather" | (250) | −0.2549 | 0.512803 |
| 133. | "everybody" | (486) | −0.254342 | 0.264646 |
| 134. | "towards" | (477) | −0.253655 | 0.233701 |
| 135. | "since" | (406) | 0.253382 | 0.441383 |
| 136. | "than" | (183) | 0.252773 | 0.294936 |
| 137. | "seriously" | (471) | −0.252017 | 0.423986 |
| 138. | "very" | (370) | −0.250992 | 0.428249 |
| 139. | "nine" | (382) | −0.249685 | 0.527259 |
| 140. | "serious" | (254) | −0.24929 | 0.269675 |
| 141. | "oh" | (333) | −0.246688 | 0.400243 |
| 142. | "less" | (326) | 0.245854 | 0.427233 |
| 143. | "que" | (503) | −0.245541 | 0.505595 |
| 144. | "clearly" | (507) | −0.244823 | 0.422129 |
| 145. | "way" | (203) | 0.244054 | 0.413626 |
| 146. | "obviously" | (467) | −0.243953 | 0.218924 |
| 147. | "inward" | (570) | 0.243608 | 0.398216 |
| 148. | "had" | (142) | 0.242249 | 0.531209 |
| 149. | "they" | (189) | 0.241873 | 0.45531 |
| 150. | "me" | (237) | −0.241594 | 0.419497 |
| 151. | "each" | (133) | −0.241481 | 0.575311 |
| 152. | "reasonably" | (539) | 0.241186 | 0.516469 |
| 153. | "which" | (265) | −0.241054 | 0.277778 |
| 154. | "willing" | (375) | −0.240897 | 0.46807 |
| 155. | "nevertheless" | (521) | −0.240474 | 0.167977 |
| 156. | "being" | (118) | −0.239722 | 0.532211 |
| 157. | "corresponding" | (464) | 0.239325 | 0.426298 |
| 158. | "toward" | (195) | 0.238815 | 0.529727 |
| 159. | "vs" | (544) | 0.2375 | 0.520269 |
| 160. | "okay" | (559) | −0.236503 | 0.530814 |
| 161. | "mostly" | (438) | 0.235148 | 0.520604 |
| 162. | "though" | (361) | 0.234496 | 0.269881 |
| 163. | "overall" | (447) | 0.233255 | 0.514158 |
| 164. | "seems" | (455) | 0.232768 | 0.518118 |
| 165. | "same" | (346) | 0.232471 | 0.406473 |
| 166. | "un" | (408) | 0.232242 | 0.399939 |
| 167. | "go" | (141) | −0.232038 | 0.199567 |
| 168. | "around" | (220) | 0.22827 | 0.402699 |
| 169. | "new" | (163) | −0.228042 | 0.345242 |
| 170. | "help" | (144) | 0.223995 | 0.557362 |
| 171. | "num_paragraphs" | (10) | −0.223295 | 0.531434 |
| 172. | "whenever" | (526) | −0.223013 | 0.309431 |
| 173. | "besides" | (517) | 0.222454 | 0.353995 |
| 174. | "whom" | (266) | 0.222216 | 0.513156 |
| 175. | "you" | (213) | 0.222102 | 0.222011 |
| 176. | "another" | (110) | −0.221903 | 0.551279 |
| 177. | "last" | (381) | 0.220536 | 0.292302 |
| 178. | "none" | (378) | −0.218266 | 0.381821 |
| 179. | "Average word length (excluding anchor text)" | (26) | −0.216809 | 0.0946313 |
| 180. | "better" | (222) | 0.216357 | 0.565476 |
| 181. | "between" | (223) | 0.215033 | 0.536771 |
| 182. | "name" | (239) | −0.214785 | 0.113971 |
| 183. | "num_sentences" | (7) | −0.213699 | 0.525355 |
| 184. | "somebody" | (506) | −0.213007 | 0.39508 |
| 185. | "still" | (353) | 0.212714 | 0.483191 |
| 186. | "aside" | (528) | −0.212471 | 0.541426 |
| 187. | "have" | (143) | −0.211956 | 0.4422 |
| 188. | "own" | (246) | 0.211691 | 0.432187 |
| 189. | "come" | (300) | −0.211569 | 0.468852 |
| 190. | "she" | (348) | 0.210749 | 0.27491 |
| 191. | "do" | (131) | −0.208934 | 0.521423 |
| 192. | "actually" | (461) | 0.208769 | 0.340389 |
| 193. | "apart" | (501) | −0.208336 | 0.505414 |
| 194. | "necessary" | (277) | −0.205756 | 0.303911 |
| 195. | "namely" | (485) | 0.205193 | 0.191561 |
| 196. | "num_blank_lines" | (9) | 0.204416 | 0.514446 |
| 197. | "came" | (123) | 0.202237 | 0.502158 |
| 198. | "possible" | (341) | 0.201593 | 0.392265 |
| 199. | "far" | (403) | −0.200058 | 0.515979 |
| 200. | "appear" | (488) | −0.20005 | 0.228998 |
| 201. | "much" | (159) | 0.19979 | 0.535769 |
| 202. | "presumably" | (564) | −0.199735 | 0.385492 |
| 203. | "sensible" | (253) | 0.199517 | 0.46209 |
| 204. | "num_text_lines" | (8) | −0.197653 | 0.540066 |
| 205. | "Fraction of "a" in text excluding anchor text." | (28) | −0.195773 | 0.405187 |
| 206. | "best" | (120) | 0.195416 | 0.240924 |
| 207. | "allow" | (449) | −0.195187 | 0.297532 |
| 208. | "provides" | (249) | 0.194578 | 0.197966 |
| 209. | "thereby" | (524) | −0.194325 | 0.32564 |
| 210. | "their" | (186) | 0.193959 | 0.516115 |
| 211. | "out" | (244) | 0.193585 | 0.450077 |
| 212. | "nor" | (278) | 0.19338 | 0.476916 |
| 213. | "becomes" | (392) | 0.191324 | 0.537059 |
| 214. | "above" | (285) | −0.190465 | 0.453726 |
| 215. | "ourselves" | (487) | −0.18975 | 0.316612 |
| 216. | "us" | (259) | −0.189414 | 0.133077 |
| 217. | "entirely" | (510) | −0.189307 | 0.295445 |
| 218. | "num_chars" | (4) | −0.187557 | 0.554027 |
| 219. | "considering" | (497) | 0.187052 | 0.41611 |
| 220. | "looking" | (390) | 0.186531 | 0.398076 |
| 221. | "quite" | (342) | 0.185848 | 0.573645 |
| 222. | "right" | (176) | −0.185716 | 0.541834 |
| 223. | "containing" | (460) | 0.185088 | 0.550611 |
| 224. | "hopefully" | (542) | −0.183931 | 0.166234 |
| 225. | "why" | (474) | 0.183165 | 0.253426 |
| 226. | "or" | (172) | −0.181549 | 0.292794 |
| 227. | "relatively" | (481) | 0.180936 | 0.503263 |
| 228. | "seeming" | (568) | −0.179574 | 0.532842 |
| 229. | "truly" | (442) | −0.179296 | 0.169198 |
| 230. | "using" | (201) | 0.179022 | 0.562014 |
| 231. | "wonder" | (427) | 0.178229 | 0.542657 |
| 232. | "well" | (204) | 0.176554 | 0.5198 |
| 233. | "beside" | (475) | 0.1758 | 0.252289 |
| 234. | "that" | (184) | −0.17493 | 0.513296 |
| 235. | "accordingly" | (516) | −0.17414 | 0.37064 |
| 236. | "tried" | (196) | −0.172555 | 0.468604 |
| 237. | "per" | (340) | 0.171356 | 0.150059 |
| 238. | "ltd" | (429) | 0.17121 | 0.367239 |
| 239. | "should" | (177) | 0.170232 | 0.258611 |
| 240. | "contains" | (225) | −0.168513 | 0.553377 |
| 241. | "appropriate" | (291) | 0.166172 | 0.443202 |
| 242. | "Avg # of anchor text words per line of lynx op with remaining text removed" | (22) | −0.165447 | 0.11338 |
| 243. | "from" | (138) | 0.164271 | 0.494533 |
| 244. | "soon" | (180) | 0.162772 | 0.132958 |
| 245. | "Fraction of "the" in text excluding anchor text." | (27) | 0.162484 | 0.0964551 |
| 246. | "just" | (152) | 0.162293 | 0.427166 |
| 247. | "then" | (357) | −0.161939 | 0.441317 |
| 248. | "believe" | (296) | −0.161696 | 0.43086 |
| 249. | "who" | (208) | −0.161503 | 0.585473 |
| 250. | "something" | (391) | −0.160978 | 0.536854 |
| 251. | "whoever" | (577) | −0.159684 | 0.537254 |
| 252. | "went" | (537) | 0.159485 | 0.412349 |
| 253. | "up" | (199) | −0.159417 | 0.289725 |
| 254. | "we" | (264) | −0.158827 | 0.393247 |
| 255. | "secondly" | (514) | 0.158703 | 0.214262 |
| 256. | "thereupon" | (565) | −0.158103 | 0.465658 |
| 257. | "unlikely" | (554) | −0.158002 | 0.47006 |
| 258. | "welcome" | (380) | −0.157692 | 0.287587 |
| 259. | "yet" | (411) | −0.156383 | 0.172094 |
| 260. | "later" | (325) | 0.154057 | 0.31847 |
| 261. | "thanks" | (441) | −0.15343 | 0.367931 |
| 262. | "ignored" | (569) | −0.153139 | 0.50582 |
| 263. | "edu" | (226) | −0.150305 | 0.223696 |
| 264. | "into" | (230) | −0.150267 | 0.456966 |
| 265. | "hi" | (275) | 0.149331 | 0.598412 |
| 266. | "this" | (190) | −0.149179 | 0.464186 |
| 267. | "rd" | (280) | −0.148986 | 0.516617 |
| 268. | "across" | (216) | 0.145137 | 0.520149 |
| 269. | "along" | (399) | −0.144809 | 0.366637 |
| 270. | "again" | (287) | −0.144794 | 0.380911 |
| 271. | "unless" | (365) | 0.143547 | 0.487478 |
| 272. | "once" | (334) | −0.143234 | 0.292598 |
| 273. | "various" | (468) | 0.142347 | 0.400381 |
| 274. | "gotten" | (567) | −0.142209 | 0.501292 |
| 275. | "like" | (155) | 0.14039 | 0.312012 |
| 276. | "nobody" | (393) | −0.13969 | 0.360666 |

| order. name | id | weight | std |
|---|---|---|---|
| 277. "Avg # of words per line of lynx op with anchor text removed." | (21) | 0.139324 | 0.0947199 |
| 278. "what" | (205) | 0.139161 | 0.499963 |
| 279. "if" | (147) | −0.139066 | 0.574746 |
| 280. "in" | (149) | −0.137286 | 0.572394 |
| 281. "anything" | (463) | 0.136676 | 0.282932 |
| 282. "self" | (252) | −0.133916 | 0.31453 |
| 283. "able" | (215) | −0.133815 | 0.553676 |
| 284. "goes" | (315) | 0.132963 | 0.520018 |
| 285. "about" | (101) | 0.131516 | 0.128355 |
| 286. "available" | (269) | −0.131126 | 0.393303 |
| 287. "liked" | (546) | −0.131073 | 0.37674 |
| 288. "ex" | (541) | −0.12964 | 0.440525 |
| 289. "anyone" | (219) | 0.129208 | 0.541087 |
| 290. "saying" | (462) | 0.127421 | 0.561404 |
| 291. "therefore" | (188) | 0.126392 | 0.574498 |
| 292. "num_words" | (5) | −0.125608 | 0.563933 |
| 293. "were" | (372) | −0.125433 | 0.496121 |
| 294. "has" | (229) | −0.125419 | 0.40344 |
| 295. "before" | (117) | −0.125263 | 0.563085 |
| 296. "behind" | (496) | −0.124484 | 0.561325 |
| 297. "keep" | (234) | 0.12431 | 0.435024 |
| 298. "whereby" | (561) | −0.122902 | 0.475409 |
| 299. "without" | (211) | 0.122704 | 0.568703 |
| 300. "during" | (305) | 0.121573 | 0.473659 |
| 301. "ought" | (533) | 0.121511 | 0.503518 |
| 302. "for" | (137) | −0.120715 | 0.394562 |
| 303. "non" | (242) | 0.120179 | 0.0965076 |
| 304. "somewhat" | (538) | −0.119715 | 0.278949 |
| 305. "kept" | (404) | 0.11957 | 0.279296 |
| 306. "beyond" | (297) | 0.119061 | 0.544531 |
| 307. "within" | (268) | −0.118828 | 0.41215 |
| 308. "especially" | (424) | −0.117882 | 0.525971 |
| 309. "brief" | (489) | −0.117782 | 0.409383 |
| 310. "nothing" | (420) | 0.117002 | 0.412791 |
| 311. "over" | (245) | −0.116779 | 0.504738 |
| 312. "through" | (192) | 0.116557 | 0.570729 |
| 313. "consider" | (130) | 0.116399 | 0.255415 |
| 314. "perhaps" | (499) | −0.115961 | 0.358842 |
| 315. "more" | (157) | −0.115713 | 0.309937 |
| 316. "Document length (word count) without anchor text" | (23) | −0.11475 | 0.548326 |
| 317. "regardless" | (344) | −0.1147 | 0.54494 |
| 318. "wish" | (495) | 0.113606 | 0.546991 |
| 319. "an" | (108) | 0.112989 | 0.543934 |
| 320. "keeps" | (476) | −0.111798 | 0.242899 |
| 321. "except" | (271) | 0.110467 | 0.578253 |
| 322. "near" | (413) | 0.110022 | 0.371633 |
| 323. "thru" | (416) | −0.109429 | 0.504315 |
| 324. "any" | (111) | 0.107028 | 0.452159 |
| 325. "almost" | (398) | 0.106641 | 0.309155 |
| 326. "few" | (272) | 0.106263 | 0.173808 |
| 327. "concerning" | (129) | 0.105738 | 0.545963 |
| 328. "little" | (156) | 0.105504 | 0.476988 |
| 329. "lately" | (498) | 0.105476 | 0.181527 |
| 330. "could" | (417) | −0.104647 | 0.114377 |
| 331. "certainly" | (444) | 0.103775 | 0.499626 |
| 332. "gets" | (451) | −0.102493 | 0.447535 |
| 333. "et" | (502) | 0.101197 | 0.503831 |
| 334. "yourself" | (397) | 0.0994363 | 0.311029 |
| 335. "wherein" | (515) | −0.0993186 | 0.585591 |
| 336. "together" | (194) | 0.0977063 | 0.373475 |
| 337. "indicate" | (491) | 0.0973426 | 0.466296 |
| 338. "at" | (115) | 0.0966459 | 0.579053 |
| 339. "given" | (313) | 0.0964377 | 0.389812 |
| 340. "asking" | (114) | 0.0959791 | 0.575355 |
| 341. "already" | (289) | −0.0948876 | 0.468117 |
| 342. "theirs" | (543) | −0.094668 | 0.512287 |
| 343. "myself" | (551) | −0.0943295 | 0.531432 |
| 344. "because" | (294) | −0.0938475 | 0.485537 |
| 345. "despite" | (456) | 0.0934967 | 0.457577 |
| 346. "used" | (260) | 0.0921309 | 0.496812 |
| 347. "several" | (347) | −0.0907439 | 0.484138 |
| 348. "1.0 - fraction of anchor text" | (25) | −0.09074 | 0.131918 |
| 349. "formerly" | (556) | 0.0905694 | 0.454271 |
| 350. "may" | (276) | −0.0873362 | 0.513008 |
| 351. "else" | (306) | −0.086794 | 0.527802 |
| 352. "himself" | (453) | 0.0867821 | 0.266228 |
| 353. "fifth" | (478) | −0.0864953 | 0.28114 |
| 354. "says" | (421) | 0.085355 | 0.546678 |
| 355. "enough" | (134) | 0.0853015 | 0.308536 |
| 356. "first" | (136) | −0.0850254 | 0.566978 |
| 357. "merely" | (330) | 0.0844566 | 0.528927 |
| 358. "hereby" | (386) | −0.0825733 | 0.43426 |
| 359. "the" | (185) | −0.0823531 | 0.548644 |
| 360. "novel" | (430) | −0.0810018 | 0.493381 |
| 361. "would" | (212) | 0.0802326 | 0.415364 |
| 362. "seem" | (535) | −0.0795525 | 0.455681 |
| 363. "flesch" | (2) | 0.0793815 | 0.464431 |
| 364. "particular" | (339) | −0.0793443 | 0.395399 |
| 365. "zero" | (555) | −0.0792081 | 0.311654 |
| 366. "did" | (412) | 0.0785752 | 0.485849 |
| 367. "one" | (170) | −0.0784201 | 0.556447 |
| 368. null | (35) | 0.078026 | 0.582182 |
| 369. "etc" | (418) | −0.0777686 | 0.232471 |
| 370. "thorough" | (360) | 0.0773932 | 0.393185 |
| 371. "thats" | (549) | −0.0770457 | 0.293841 |
| 372. "let" | (385) | −0.0765314 | 0.115686 |
| 373. "get" | (139) | 0.0750087 | 0.530255 |
| 374. "want" | (202) | −0.074861 | 0.560318 |
| 375. "eight" | (469) | 0.0747994 | 0.2295 |
| 376. "sub" | (256) | 0.0744016 | 0.535779 |
| 377. "yours" | (383) | 0.073955 | 0.4903 |
| 378. "think" | (258) | −0.0737303 | 0.426032 |
| 379. "instead" | (324) | −0.0733831 | 0.179677 |
| 380. "among" | (107) | −0.0733673 | 0.545769 |
| 381. "old" | (243) | 0.0723823 | 0.361828 |
| 382. "unfortunately" | (536) | −0.0721401 | 0.198608 |
| 383. "take" | (181) | −0.0717333 | 0.547438 |
| 384. "doing" | (132) | 0.0716102 | 0.562868 |
| 385. "according" | (286) | −0.0715544 | 0.576836 |
| 386. "cause" | (125) | −0.0704921 | 0.492878 |
| 387. "these" | (358) | 0.0700587 | 0.460573 |
| 388. "whether" | (374) | 0.0695506 | 0.453576 |
| 389. "with" | (210) | 0.0694474 | 0.466898 |
| 390. "thence" | (573) | −0.0678765 | 0.56831 |
| 391. "will" | (209) | 0.066577 | 0.516757 |
| 392. "was" | (263) | −0.0663541 | 0.574323 |
| 393. "placed" | (379) | −0.0660772 | 0.346278 |
| 394. "seen" | (479) | −0.0659723 | 0.505724 |
| 395. "upon" | (367) | 0.0657723 | 0.248498 |
| 396. "wants" | (371) | 0.0644256 | 0.202835 |
| 397. "probably" | (500) | 0.0634823 | 0.188288 |
| 398. "while" | (207) | −0.0613835 | 0.125429 |
| 399. null | (46) | 0.0612267 | 0.590843 |
| 400. "further" | (312) | 0.0606675 | 0.449438 |
| 401. "Fraction of "an" in text excluding anchor text." | (29) | −0.0593747 | 0.138265 |
| 402. null | (20) | 0.0593322 | 0.551894 |
| 403. "four" | (228) | −0.0591526 | 0.556366 |
| 404. "anywhere" | (290) | 0.0590882 | 0.450743 |
| 405. "wherever" | (426) | 0.0586491 | 0.32174 |
| 406. "alone" | (288) | −0.0584367 | 0.229981 |
| 407. "such" | (354) | 0.0582371 | 0.553083 |
| 408. null | (34) | 0.0580683 | 0.564831 |
| 409. "otherwise" | (337) | 0.0579097 | 0.556272 |
| 410. "can" | (124) | −0.0573672 | 0.566604 |
| 411. "uses" | (262) | 0.0573448 | 0.569534 |
| 412. "unto" | (557) | −0.0557843 | 0.29282 |
| 413. "look" | (328) | −0.0555572 | 0.554487 |
| 414. "viz" | (525) | −0.0554966 | 0.428656 |
| 415. "where" | (206) | −0.0553248 | 0.558178 |
| 416. "as" | (113) | −0.0550984 | 0.544366 |
| 417. "ie" | (437) | 0.0548309 | 0.344708 |
| 418. "co" | (270) | −0.054605 | 0.115667 |
| 419. "below" | (119) | −0.0533078 | 0.269191 |
| 420. "regarding" | (405) | 0.0526944 | 0.568752 |
| 421. "hence" | (511) | −0.0518125 | 0.371168 |
| 422. "your" | (214) | 0.0508094 | 0.338665 |
| 423. null | (95) | 0.0504889 | 0.57204 |
| 424. "immediate" | (148) | 0.0500414 | 0.411872 |
| 425. "plus" | (248) | 0.0500069 | 0.547414 |
| 426. "does" | (303) | −0.0496776 | 0.557271 |
| 427. "going" | (316) | 0.0494902 | 0.141309 |
| 428. "nowhere" | (440) | 0.0493186 | 0.148353 |

-continued

| order. | name | id | weight | std |
|---|---|---|---|---|
| 429. | "how" | (146) | −0.048353 | 0.573056 |
| 430. | null | (55) | 0.0482441 | 0.567683 |
| 431. | null | (33) | 0.0469152 | 0.595646 |
| 432. | "herself" | (452) | −0.0468346 | 0.365021 |
| 433. | "to" | (193) | −0.0464596 | 0.53488 |
| 434. | null | (73) | 0.0463794 | 0.573055 |
| 435. | "whereas" | (527) | 0.046254 | 0.50354 |
| 436. | null | (80) | 0.046035 | 0.575191 |
| 437. | null | (18) | 0.0456669 | 0.587246 |
| 438. | "different" | (302) | −0.0454226 | 0.414251 |
| 439. | "syllables_per_word" | (11) | 0.0445158 | 0.0810561 |
| 440. | "sometime" | (575) | −0.0439125 | 0.569956 |
| 441. | "least" | (387) | 0.0437659 | 0.510981 |
| 442. | "it" | (231) | 0.0426356 | 0.250492 |
| 443. | "also" | (104) | −0.0422691 | 0.541659 |
| 444. | "qv" | (571) | −0.0420383 | 0.394455 |
| 445. | "shall" | (422) | −0.0420361 | 0.472767 |
| 446. | "percent_complex_words" | (6) | −0.0416394 | 0.098915 |
| 447. | null | (64) | 0.0413607 | 0.57636 |
| 448. | "useful" | (261) | −0.0399627 | 0.25127 |
| 449. | "eg" | (562) | −0.0395573 | 0.41768 |
| 450. | "must" | (238) | −0.0384369 | 0.524003 |
| 451. | null | (39) | 0.0377421 | 0.577618 |
| 452. | null | (79) | 0.0373912 | 0.574735 |
| 453. | "sup" | (433) | −0.037357 | 0.408118 |
| 454. | "however" | (323) | −0.0373109 | 0.216392 |
| 455. | null | (16) | 0.0362969 | 0.580413 |
| 456. | "followed" | (470) | −0.0356895 | 0.183624 |
| 457. | "ours" | (545) | 0.0355177 | 0.433293 |
| 458. | null | (78) | 0.0349696 | 0.558135 |
| 459. | "try" | (197) | 0.0346534 | 0.256942 |
| 460. | "those" | (191) | 0.0344842 | 0.570277 |
| 461. | "them" | (187) | −0.0343415 | 0.569149 |
| 462. | null | (41) | 0.0338687 | 0.579237 |
| 463. | "gives" | (314) | 0.0329499 | 0.252902 |
| 464. | "respectively" | (431) | −0.0326653 | 0.395434 |
| 465. | null | (53) | 0.0325171 | 0.551269 |
| 466. | null | (14) | 0.032318 | 0.570473 |
| 467. | "getting" | (140) | 0.0321962 | 0.485858 |
| 468. | "third" | (359) | −0.0319038 | 0.475615 |
| 469. | "knows" | (235) | −0.0311182 | 0.556308 |
| 470. | null | (37) | 0.0306648 | 0.578682 |
| 471. | null | (87) | 0.030473 | 0.557271 |
| 472. | null | (48) | 0.0303094 | 0.583154 |
| 473. | null | (44) | 0.0300287 | 0.575987 |
| 474. | "see" | (281) | −0.0299924 | 0.510299 |
| 475. | null | (57) | 0.0298343 | 0.567072 |
| 476. | "everything" | (309) | 0.0296675 | 0.471695 |
| 477. | "Average of the top five highest web IDFs" | (30) | 0.0293436 | 0.108904 |
| 478. | "sent" | (282) | 0.0293161 | 0.374278 |
| 479. | null | (60) | 0.0291397 | 0.587952 |
| 480. | "causes" | (126) | −0.029118 | 0.534274 |
| 481. | null | (77) | 0.0288585 | 0.570216 |
| 482. | "only" | (171) | −0.0285484 | 0.57056 |
| 483. | "particularly" | (247) | 0.0274855 | 0.563178 |
| 484. | "consequently" | (529) | −0.0270428 | 0.560391 |
| 485. | "lest" | (520) | 0.026956 | 0.569501 |
| 486. | "kincaid" | (3) | 0.0265465 | 0.527479 |
| 487. | "itself" | (233) | −0.0264856 | 0.552301 |
| 488. | "most" | (158) | −0.0261055 | 0.559712 |
| 489. | "onto" | (465) | 0.0259714 | 0.262483 |
| 490. | "thereafter" | (523) | 0.0259034 | 0.14007 |
| 491. | "but" | (121) | 0.0246229 | 0.543958 |
| 492. | "sometimes" | (350) | 0.0238818 | 0.387382 |
| 493. | null | (63) | 0.0238779 | 0.579536 |
| 494. | null | (17) | 0.0231518 | 0.58899 |
| 495. | "whatever" | (443) | −0.0226753 | 0.582677 |
| 496. | null | (45) | 0.0225388 | 0.545589 |
| 497. | "associated" | (395) | −0.0219575 | 0.502391 |
| 498. | "two" | (198) | 0.0218879 | 0.571762 |
| 499. | null | (90) | 0.0217011 | 0.569658 |
| 500. | "might" | (331) | −0.0209851 | 0.543155 |
| 501. | "words_per_sentence" | (12) | 0.0209161 | 0.528976 |
| 502. | null | (85) | 0.0208549 | 0.559955 |
| 503. | null | (62) | 0.0207868 | 0.5834 |
| 504. | null | (50) | 0.0206237 | 0.576653 |
| 505. | null | (82) | 0.0203684 | 0.579892 |
| 506. | null | (13) | 0.02016 | 0.564816 |
| 507. | "former" | (311) | −0.0199755 | 0.565022 |
| 508. | "there" | (257) | −0.0193889 | 0.536455 |
| 509. | null | (51) | 0.0189772 | 0.590405 |
| 510. | null | (49) | 0.0188936 | 0.601399 |
| 511. | null | (84) | 0.0188629 | 0.558694 |
| 512. | "looks" | (531) | −0.0186741 | 0.580641 |
| 513. | null | (56) | 0.018664 | 0.582126 |
| 514. | "insofar" | (563) | 0.0185199 | 0.327621 |
| 515. | null | (66) | 0.0181481 | 0.577965 |
| 516. | null | (74) | 0.0180852 | 0.563354 |
| 517. | "everyone" | (308) | 0.0177242 | 0.518573 |
| 518. | "taken" | (182) | −0.0175745 | 0.225554 |
| 519. | "likely" | (327) | 0.017207 | 0.425293 |
| 520. | "know" | (153) | 0.0170323 | 0.412988 |
| 521. | null | (40) | 0.0169843 | 0.57053 |
| 522. | "thus" | (363) | 0.0169428 | 0.539957 |
| 523. | null | (75) | 0.0167014 | 0.559415 |
| 524. | null | (68) | 0.0160537 | 0.583812 |
| 525. | null | (15) | 0.0157574 | 0.5691 |
| 526. | null | (70) | 0.0155226 | 0.562965 |
| 527. | "currently" | (402) | 0.0153056 | 0.4084 |
| 528. | "gone" | (490) | −0.0147289 | 0.537004 |
| 529. | null | (94) | 0.0143283 | 0.577168 |
| 530. | null | (99) | 0.0138578 | 0.575932 |
| 531. | null | (67) | 0.0137805 | 0.582027 |
| 532. | "cannot" | (298) | 0.013701 | 0.5472 |
| 533. | null | (92) | 0.0131282 | 0.582806 |
| 534. | null | (76) | 0.0129182 | 0.558516 |
| 535. | null | (89) | 0.0128523 | 0.589602 |
| 536. | null | (61) | 0.0122759 | 0.584549 |
| 537. | "now" | (166) | 0.0121919 | 0.485761 |
| 538. | "fog" | (1) | −0.0116886 | 0.506574 |
| 539. | "nd" | (240) | −0.0114611 | 0.537238 |
| 540. | null | (59) | 0.0112281 | 0.56056 |
| 541. | null | (42) | 0.0108568 | 0.586807 |
| 542. | "Average of the top five highest TFs" | (31) | 0.0106864 | 0.098148 |
| 543. | null | (52) | 0.0103249 | 0.575719 |
| 544. | "ones" | (335) | −0.0102175 | 0.514625 |
| 545. | "too" | (364) | 0.0101281 | 0.570721 |
| 546. | null | (96) | 0.00980408 | 0.570074 |
| 547. | "here" | (145) | −0.00953005 | 0.508984 |
| 548. | null | (71) | 0.00893064 | 0.552502 |
| 549. | null | (58) | 0.00831833 | 0.573421 |
| 550. | null | (98) | 0.00826938 | 0.582983 |

The above example weighting coefficients lend themselves to a threshold level of zero, such that the magnitude of a familiarity level above zero identifies how introductory a document is and the magnitude of a familiarity level below zero identifies how advanced a document is. One skilled in the art will recognize that the threshold level can be modified as a tradeoff for more confidence in the introductory nature or the advanced nature of a document.

In one embodiment, the familiarity level classifier 240/320 may incorporate techniques from Harper et al's HARD 2004 work, which assumes that users unfamiliar with a topic prefer documents with representative terms and that users familiar with a topic prefer documents with discriminative terms. Such representative/discriminatory terms may be identified using a clarity measure. By interpreting the clarity measure in a particular way, the familiarity level classifier 240/320 may select representative and/or discriminative terms, which it can use to modify the query. In one embodiment, the familiarity level classifier 240/320 may apply this technique to obtain a search result, which can be classified using the familiarity level classification function 435.

Figure 5:
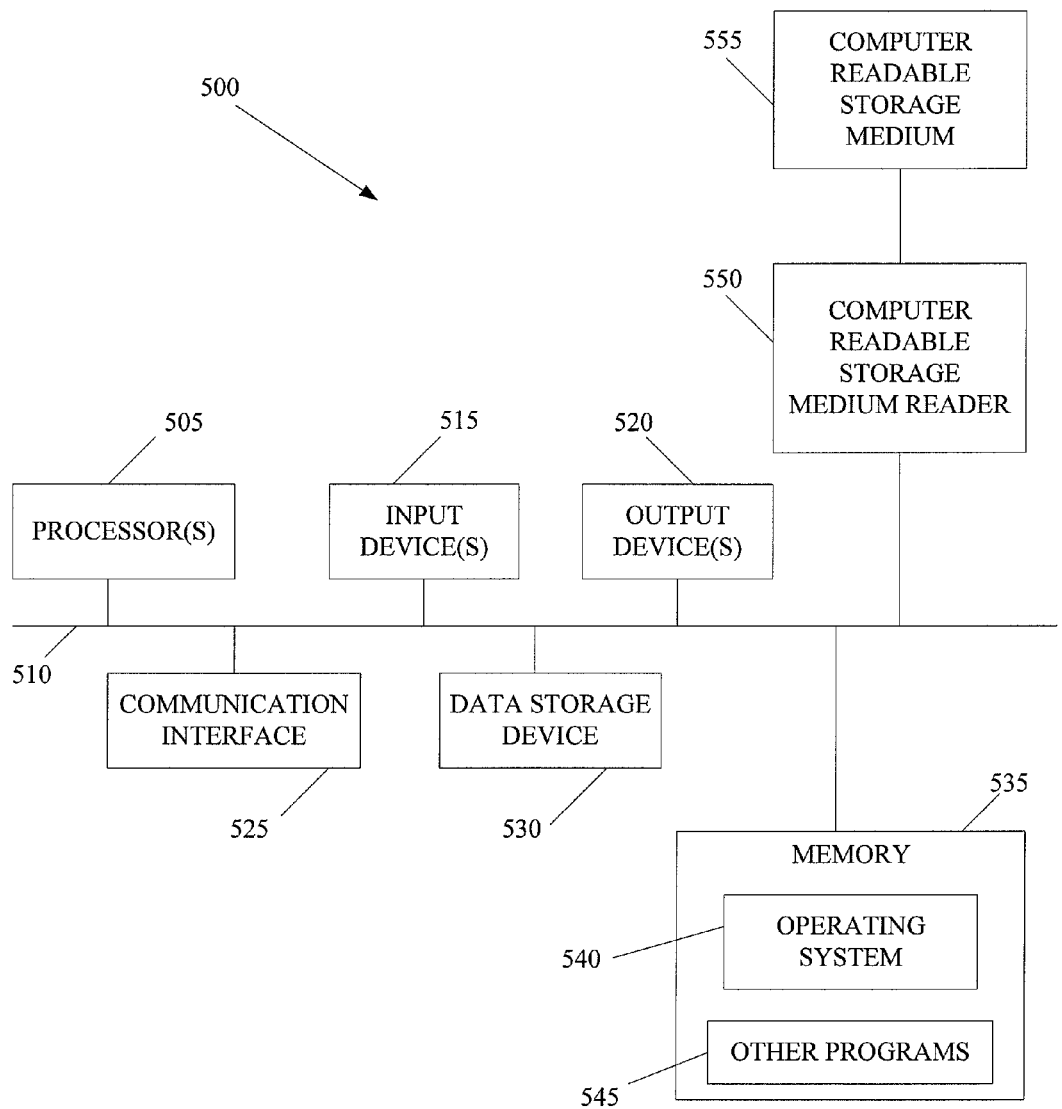
FIG. 5 is a block diagram illustrating details of a computer system, in accordance with an embodiment of the present invention.

FIG. 5 is a block diagram illustrating details of an example computer system 500, of which the familiarity level classifier 110, the response engine 120, the search engine 235/315, the crawler 220, the user computers 205, the websites 215, the indexing module 225/305, the index data store 230/310, etc. may be instances. Computer system 500 includes a processor 505, such as an Intel Pentium® microprocessor or a Motorola Power PC® microprocessor, coupled to a communications channel 510. The computer system 500 further includes an input device 515 such as a keyboard or mouse, an output device 520 such as a cathode ray tube display, a communications device 525, a data storage device 530 such as a magnetic disk, and memory 535 such as Random-Access Memory (RAM), each coupled to the communications channel 510. The communications interface 525 may be coupled to a network such as the wide-area network commonly referred to as the Internet. One skilled in the art will recognize that, although the data storage device 530 and memory 535 are illustrated as different units, the data storage device 530 and memory 535 can be parts of the same unit, distributed units, virtual memory, etc.

The data storage device 530 and/or memory 535 may store an operating system 540 such as the Microsoft Windows NT or Windows/95 Operating System (OS), the IBM OS/2 operating system, the MAC OS, or UNIX operating system and/or other programs 545. It will be appreciated that an embodiment may be implemented on platforms and operating systems other than those mentioned. An embodiment may be written using JAVA, C, and/or C++ language, or other programming languages, possibly using object oriented programming methodology.

One skilled in the art will recognize that the computer system 500 may also include additional information, such as network connections, additional memory, additional processors, LANs, input/output lines for transferring information across a hardware channel, the Internet or an intranet, etc. One skilled in the art will also recognize that the programs and data may be received by and stored in the system in alternative ways. For example, a computer-readable storage medium (CRSM) reader 550 such as a magnetic disk drive, hard disk drive, magneto-optical reader, CPU, etc. may be coupled to the communications bus 510 for reading a computer-readable storage medium (CRSM) 555 such as a magnetic disk, a hard disk, a magneto-optical disk, RAM, etc. Accordingly, the computer system 500 may receive programs and/or data via the CRSM reader 550. Further, it will be appreciated that the term "memory" herein is intended to cover all data storage media whether permanent or temporary.

Figure 6:
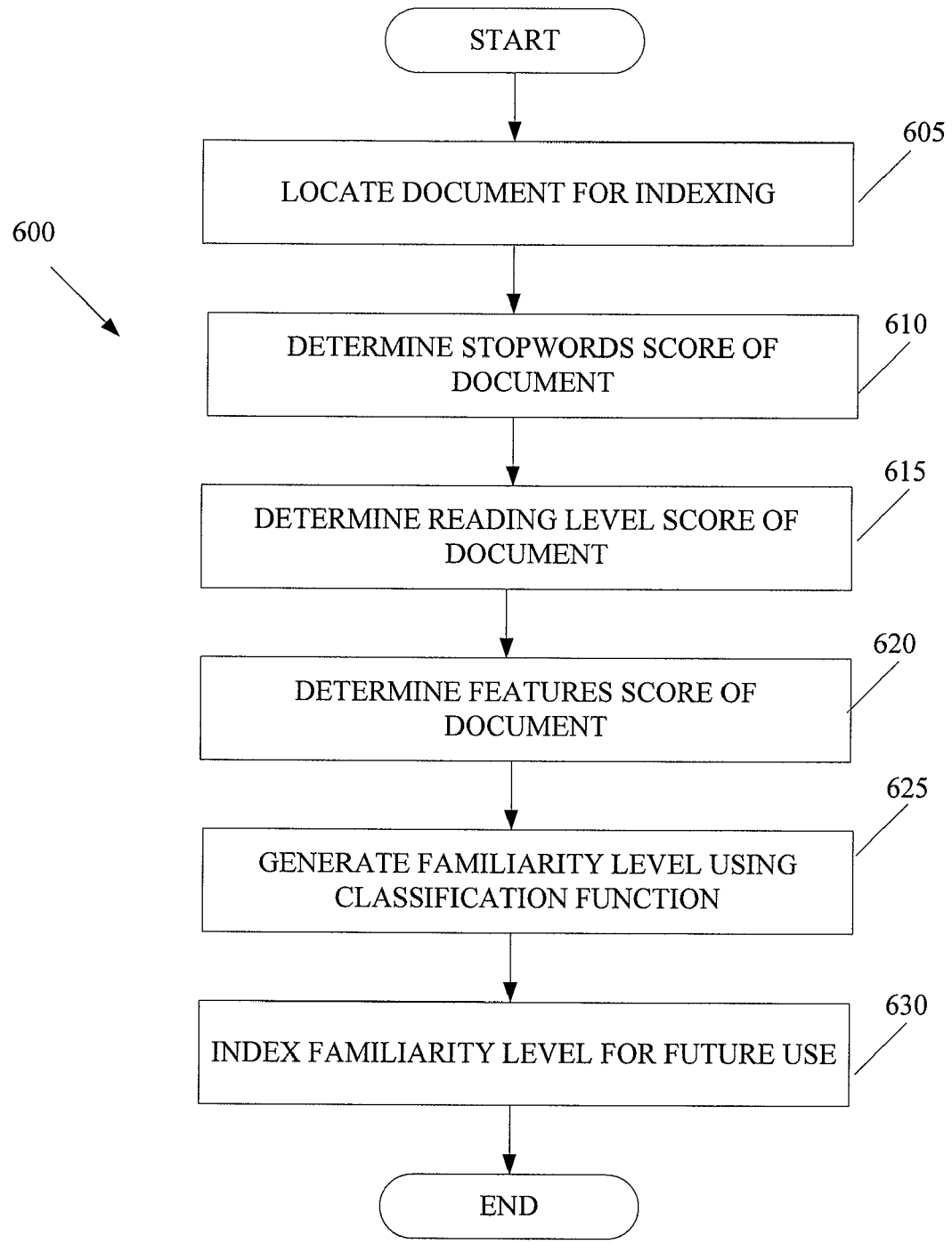
FIG. 6 is a flowchart illustrating details of a method of generating and indexing familiarity levels of documents, in accordance with an embodiment of the present invention.

FIG. 6 is a flowchart illustrating a method 600 of biasing web search results based on familiarity level, in accordance with an embodiment of the present invention. Method 600 begins in step 605 with the crawler 220 locating a document for indexing. The stopwords engine 405 in step 610 uses the introductory level stopwords 410 and the advanced level stopwords 415 to determine a stopwords score. In one example, the stopwords score is based on a function of the number of times particular stopwords are presented in the document. The reading level engine 420 in step 615 determines a reading level score of the document. In one example, the reading level score is based on a combination of Fog, Flesch and Kincaid equations, in addition to readability features such as the number of characters, number of words, percentage of complex words, number of sentences, number of text lines, number of blank lines, number of paragraphs, number of syllables per word, the number words per sentence, etc. The document features engine 425 in step 620 determines the document features score. In one example the document features score is based on document features such as the average number of words per line with anchor text removed, the average number of anchor text words per line with other text removed, the document length excluding anchor text, the anchor text count, the fraction of non-anchor text in document, the average word length (excluding anchor text), the fraction of term "the" in text excluding anchor text, the fraction of term "a" in text excluding anchor text, the fraction of term "an" in text excluding anchor text, the average of the top five highest TFs, and the similarity of WordNet expansion of top 10% of document with remaining 90%.

The familiarity level classifier module 430 in step 625 inputs the stopwords score, the reading level score and the document features score into a familiarity level classification function 435 to generate a familiarity level for the document. In one example, the stopwords score, reading level score and document features score are normalized values, whether each a defined as a binary value, a sliding scale value or a descriptor. The familiarity level classification function 435 may use weighting coefficients for each of the scores, such that each score need not be weighted equally. For example, the stopwords score may be weighted more heavily than the other scores. The classification function 435 may incorporate other scores such as a clarity score indicative of the clarity of the document. The indexing module 225 in step 630 indexes the familiarity level score in the index data store 230 for future use. Method 600 then ends.

Figure 7:
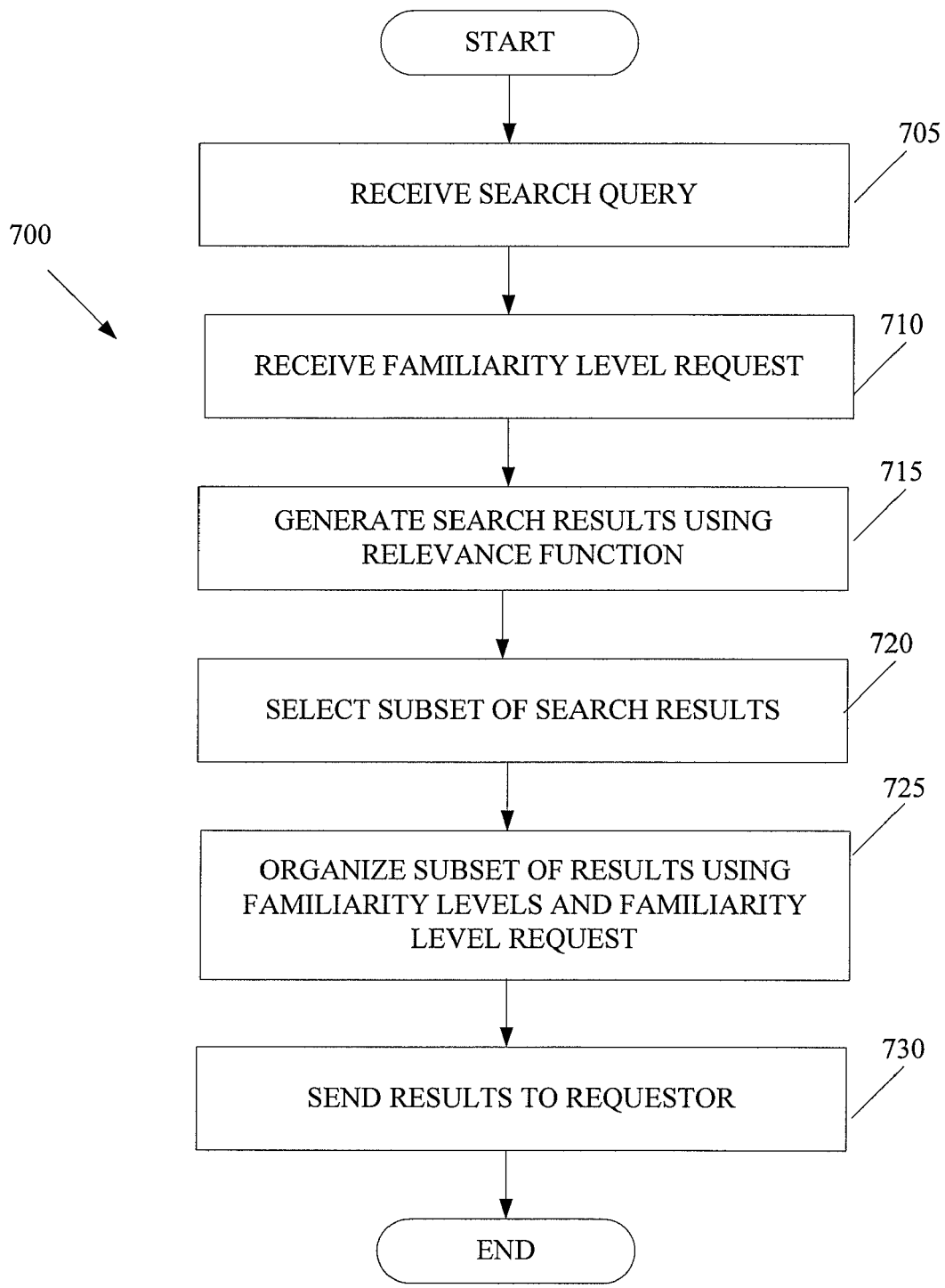
FIG. 7 is a flowchart illustrating details of a method of biasing search results based on familiarity levels, in accordance with a first embodiment of the present invention.

FIG. 7 is a flowchart illustrating a method 700 of biasing search results based on the familiarity scores, in accordance with first embodiment of the present invention. Method 700 begins with the search engine 235 in step 705 receiving a search query from the user computer 205. The search engine 235 in step 710 also receives a familiarity level request from the user computer 205. The search engine module 265 of the search engine 235 in step 715 generates search results using the relevance function 270. In one example, the search engine module 265 does not use the familiarity levels to generate the search results. The familiarity module 275 on the search engine 235 in step 720 selects a subset of the search results. In one example, the familiarity module 275 in step 720 selects the top 10, 20, 50 or 100 documents of the search results as the subset. The familiarity module 275 in step 725 organizes the subset of the results using the familiarity levels and the familiarity level request. Then, the search engine 235 in step 730 forwards the results to the user computer 205. Method 700 then ends.

Figure 8:
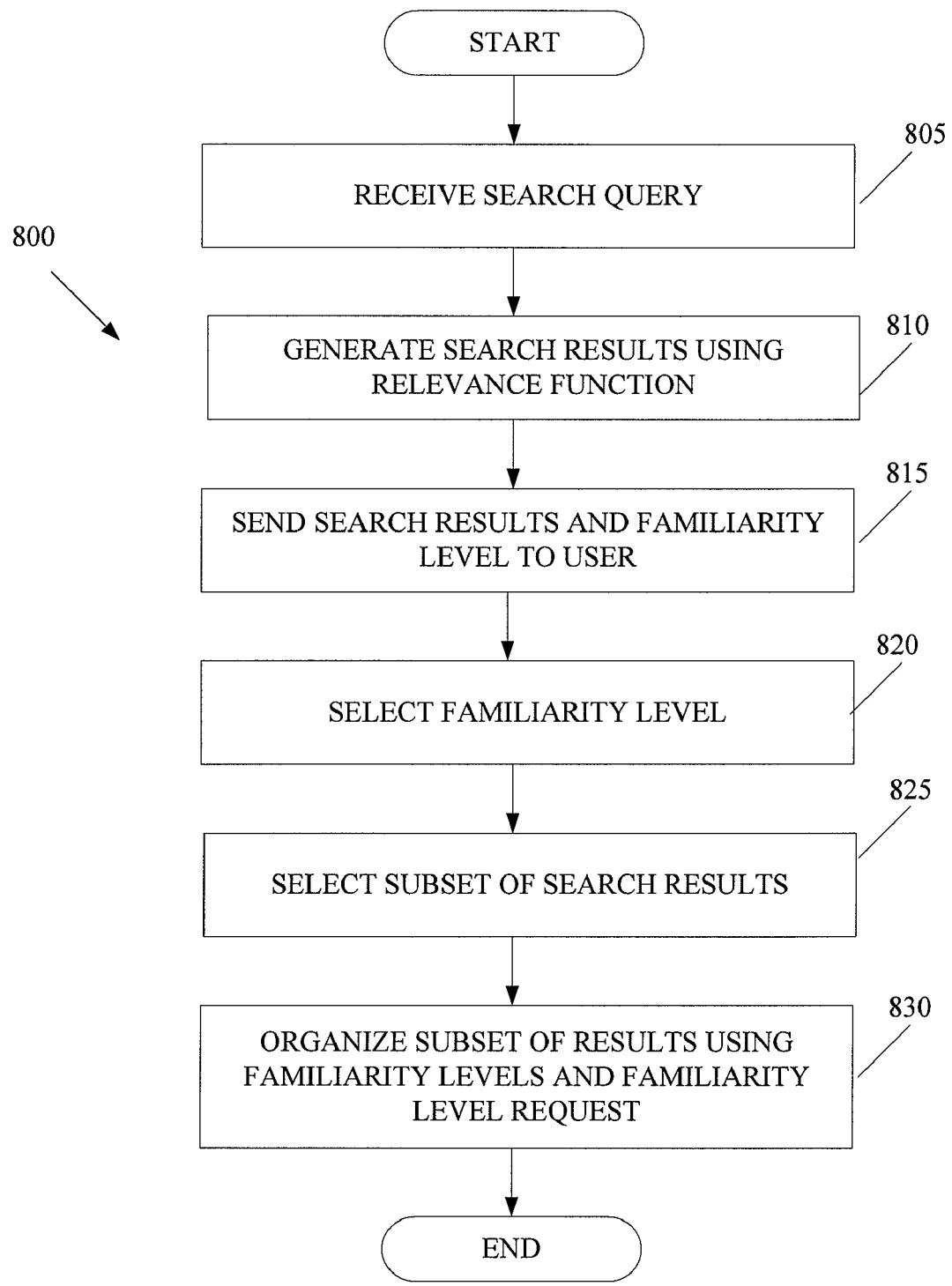
FIG. 8 is a flowchart illustrating details of a method of biasing search results based on familiarity levels, in accordance with a second embodiment of the present invention.

FIG. 8 is a flowchart illustrating a method 800 of biasing search results based on the familiarity scores, in accordance with a second embodiment of the present invention. Method 800 begins with the search engine 235 in step 805 receiving a search query from the user computer 205. The search engine module 265 of the search engine 235 in step 810 generates search results using the relevance function 270. In one example, the search engine module 265 does not use the familiarity levels to generate the search results. The search engine 235 in step 815 forwards the search results and familiarity levels for the documents or a portion of the documents to the user computer 205. A familiarity module in communication with a browser on the user computer 205 in step 820 receives a familiarity level request from the requestor. The familiarity module may be similar to familiarity module 275, may be on the user computer 205, may be integral with the browser on the user computer 205, or may be on another computer 205 in the network 210. The familiarity module in step 825 selects a subset of the search results. In one example, the familiarity module select the top 10, 20, 50 or 100 documents of the search results as the subset. The familiarity module in step 830 organizes the subset of the results using the familiarity levels and the familiarity level request. Then, method 800 ends.

The foregoing description of the preferred embodiments of the present invention is by way of example only, and other variations and modifications of the above-described embodiments and methods are possible in light of the foregoing teaching. Although the network sites are being described as separate and distinct sites, one skilled in the art will recognize that these sites may be a part of an integral site, may each include portions of multiple sites, or may include combinations of single and multiple sites. The various embodiments set forth herein may be implemented utilizing hardware, software, or any desired combination thereof. For that matter, any type of logic may be utilized which is capable of implementing the various functionality set forth herein. Components may be implemented using a programmed general purpose digital computer, using application specific integrated circuits, or using a network of interconnected conventional components and circuits. Connections may be wired, wireless, modem, etc. The embodiments described herein are not intended to be exhaustive or limiting. The present invention is limited only by the following claims.

The invention claimed is:

1. A method, comprising:
    receiving a document;
    conducting a stopwords analysis of stopwords in the document, wherein conducting the stopwords analysis includes conducting stopwords analysis of introductory level stopwords suggesting introductory content and advanced level stopwords suggesting advanced content;
    conducting a reading level analysis of the document;
    conducting a feature analysis of the document;
    generating a stopwords score based on the stopwords analysis; and
    generating a document familiarity level based on the stopwords score, the reading level analysis, and the feature analysis, wherein generating the document familiarity level includes implementing a familiarity level classification function that incorporates weighting coefficients for each of the stopwords analysis, reading level analysis and the feature analysis.

2. The method of claim 1, wherein the document includes a website.

3. The method of claim 1, wherein the document is received at index time.

4. The method of claim 1, wherein the document is one of several documents returned in response to a search query.

5. The method of claim 1, further comprising generating a stopwords score based on the stopwords analysis, the stopwords score including a sliding scale value.

6. The method of claim 1, further comprising generating a stopwords score based on the stopwords analysis, the stopwords score including a descriptor from a set of descriptors.

7. The method of claim 1, further comprising conducting a feature analysis of the document, and wherein the generating the document familiarity level is also based on the feature analysis.

8. A non-transitory computer readable medium comprising:
    a stopwords engine configured to conduct a stopwords analysis of stopwords in a document and to generate a stopwords score based on the stopwords analysis, the stopwords score including a binary value, wherein the stopwords engine is configured to conduct stopwords analysis of introductory level stopwords suggesting introductory content and advanced level stopwords suggesting advanced content;
    a reading level engine configured to conduct a reading level analysis of the document;
    a document features engine configured to conduct a feature analysis of the document; and
    a familiarity level classifier module configured to generate a document familiarity level based on the stopwords score, the reading level analysis, and the feature analysis, the familiarity level classifier module is further configured to implement a familiarity level classification function that incorporates weighting coefficients for each of the stopwords analysis, reading level analysis and the feature analysis.

9. The classifier of claim 8, wherein the document includes a website.

10. The classifier of claim 8, wherein the classifier is in an indexing module.

11. The classifier of claim 8, wherein the classifier is in a search engine.

12. The classifier of claim 8, wherein the classifier is in a user computer.

13. The classifier of claim 8, wherein the stopwords engine is configured to generate a stopwords score based on the stopwords analysis, the stopwords score including a sliding scale value.

14. The classifier of claim 8, wherein the stopwords engine is configured to generate a stopwords score based on the stopwords analysis, the stopwords score including a descriptor from a set of descriptors.

15. The classifier of claim 8, further comprising a document feature engine for conducting a feature analysis of the document, and wherein the familiarity level classifier module is configured to generate the document familiarity level also based on the feature analysis.

16. A system, comprising:
    means for receiving a document;
    means for conducting a stopwords analysis of stopwords in the document, including stopwords analysis of introductory level stopwords suggesting introductory content and advanced level stopwords suggesting advanced content;
    means for conducting a reading level analysis of the document;
    means for conducting a feature analysis of the document;
    means for generating a stopwords score based on the stopwords analysis; and
    means for generating a document familiarity level based on the stopwords score, the reading level analysis, and the feature analysis, wherein generating the document familiarity level includes implementing a familiarity level classification function that incorporates weighting coefficients for each of the stopwords analysis, reading level analysis and the feature analysis.

* * * * *